United States Patent
Grant

(10) Patent No.: US 6,811,258 B1
(45) Date of Patent: Nov. 2, 2004

(54) EYEGLASSES FOR IMPROVED VISUAL CONTRAST USING HETERO-CHROMIC LIGHT FILTRATION

(76) Inventor: Alan H. Grant, 3208 Woodhollow Dr., Chevy Chase, MD (US) 20815

( * ) Notice: Subject to any disclaimer, the term of this patent is extended or adjusted under 35 U.S.C. 154(b) by 8 days.

(21) Appl. No.: 10/600,752

(22) Filed: Jun. 23, 2003

(51) Int. Cl.$^7$ .................................................. G02C 7/10
(52) U.S. Cl. .................... 351/163; 351/177; 351/165
(58) Field of Search ........................ 351/41, 44, 49, 351/159, 160 R, 160 H, 161–3, 165, 45, 177–8

(56) References Cited

U.S. PATENT DOCUMENTS

| | | | |
|---|---|---|---|
| 2,136,303 A | | 11/1938 | Lumiere .................. 359/464 |
| 3,586,423 A | | 6/1971 | Zeltzer ................... 351/246 |
| 4,300,819 A | | 11/1981 | Taylor ..................... 351/41 |
| 4,320,940 A | * | 3/1982 | Mueller et al. ............ 351/44 |
| 4,702,574 A | * | 10/1987 | Bawa ...................... 351/162 |
| 4,794,435 A | * | 12/1988 | Suzuki et al. ............ 351/163 |
| 4,983,030 A | * | 1/1991 | Chandler .................. 351/86 |
| 5,218,386 A | | 6/1993 | Levien .................... 351/163 |
| 5,408,278 A | | 4/1995 | Christman ................. 351/44 |
| 5,432,568 A | * | 7/1995 | Betz et al. ............... 351/45 |
| 5,617,154 A | * | 4/1997 | Hoffman ................... 351/162 |
| 5,917,573 A | | 6/1999 | Davis ..................... 351/46 |
| 6,678,100 B1 | * | 1/2004 | Marason et al. ........... 359/888 |
| 2001/0048505 A1 | | 12/2001 | Silliphant ............... 351/159 |
| 2002/0135734 A1 | | 9/2002 | Reichow et al. ........... 351/163 |

\* cited by examiner

Primary Examiner—Jordan M. Schwartz
Assistant Examiner—Jessica Stultz
(74) Attorney, Agent, or Firm—Jacobson Holman PLLC

(57) ABSTRACT

Eyeglasses for enhancing visual contrast through the use of hetero-chromic filters are provided. One lens of the glasses is tinted pale green while the other lens is tinted to be a slightly darker yellow. The resulting pair of glasses, when worn, creates color-retinal rivalry between the two eyes to encourage better visual contrast and provide improved vision quality, especially at night. Such hetero-chromic filtration may also be effectively embodied within contact lenses, whether hard, gas-permeable or hydrophilic soft lenses, by incorporating an appropriate dye into each contact lens that is both benign and non-irritating to the eye tissues.

28 Claims, 4 Drawing Sheets

EYEGLASSES FOR IMPROVED VISUAL CONTRAST USING HETERO-CHROMIC LIGHT FILTRATION

BACKGROUND OF THE INVENTION

1. Field of the Invention

The present invention is related to the field of vision correction and, more particularly, to eyeglasses using hetero-chromic filters for improved visual contrast.

2. Description of the Related Art

Most individuals start to lose quality of vision by the end of the fourth decade of life and especially past the age of 50. With the 'greying' of America, even when the eye is emmetropic or the corrected vision approximates 20/20 by means of a spectacle prescription and/or contact lenses, there are regressive decrements in visual quality that can be attributed to changes in the ocular media and retina. These changes are characterized by a decrease in retinal illuminance, increased 'disability glare,' reduced foveal flicker sensitivity, and loss of contrast sensitivity.

Adult levels of contrast sensitivity are reached at approximately age 7, and there follows a protracted leveling period until onset of midlife decline. In and of itself, contrast sensitivity bears a direct relationship to visual acuity capability (superacuity=20/20 or better; normal acuity=20/20 or less.) Well understood is that under the best of refractive circumstances, we lose at least one letter of visual acuity every 20 years. Contrast sensitivity for letters, past age 65, then undergoes significant loss with further aging. Even prior to the detection of early senile cataract formation, there is observably lessened intensity of the $4^{th}$ Purkinje Image, as measured by the Lens Absorption Meter (LAM). Further, with aging, most individuals will encounter gradual loss of correctable vision because of cataract formation. Macular degeneration is also becoming a greater threat to vision in the elderly. Whatever the cause, visual losses usually do not proceed symmetrically but, at any point in time, are measurably greater in one eye that the other.

In addition to advancing age, as the daylight hours shorten during the late fall and toward the mid-winter months, longer hours of darkness impact adversely upon our visual perception. At dusk there is poor visual contrast for driving, and our ability to accurately judge distances lessens. Also, on rainy nights, reflections from vehicles and street lights are especially distracting.

Efforts at enhanced vision perception have previously been undertaken in connection with color blindness and improved color perception, as representatively disclosed in U.S. Pat. Nos. 5,917,573, 4,300,819 and 3,586,423 to Davis, Taylor and Zeltzer, respectively. Such devices rely upon one or more lenses from the long end of the visible spectrum, namely red, to aid in the distinguishing and perception of colors.

Analyglyphic devices have also been developed which receive long (red) and short (blue/green) wavelengths separately in each eye for stereoscopic viewing. However, due to the highly dissimilar wavelength images, significant color-retinal rivalry is induced, with associated subjective "washing" of red and green colors as perceived by the user of the device. When significant color-retinal rivalry persists, the brain will begin to suppress either one of the two images, resulting in loss of binocular vision.

Therefore, a need exists for a light filtration device that can enhance visual contrast and overall vision quality, independently of improvements in visual acuity, and without disrupting binocularity.

SUMMARY OF THE INVENTION

In view of the foregoing, one object of the present invention is to overcome the difficulties associated with poor contrast sensitivity, particularly in low or scattered light environments, such as is encountered during dusk or nighttime driving, or on cloudy, rainy or snowy days.

Another object of the present invention is to provide eyewear having hetero-chromic filters to enhance visual contrast.

A further object of the present invention is to provide within a pair of eyeglasses viewing lenses of two different colors which, while inducing color-retinal rivalry between the two eyes, are sufficiently close in wavelength to avoid loss of binocular vision.

Yet another object of the present invention is to provide eyewear, particularly eyeglasses or contact lenses, in which one lens provides a pale green filter and the other lens provides a slightly darker yellow filter in order to enhance visual contrast.

A still further object of the invention is to enhance prescription eyewear with the addition of respective green and yellow filters within the corrective lenses.

In accordance with this and other objects, the present invention is directed to eyewear in which visual contrast is enhanced using hetero-chromic filters. When employed with glasses, one lens that has been tinted pale green and a second lens that has been tinted to be a slightly darker yellow, are placed within an eyeglass frame. The resulting pair of glasses, when worn, creates limited color-retinal rivalry between the two eyes and encourages better visual contrast resulting in better quality of vision, especially at night.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
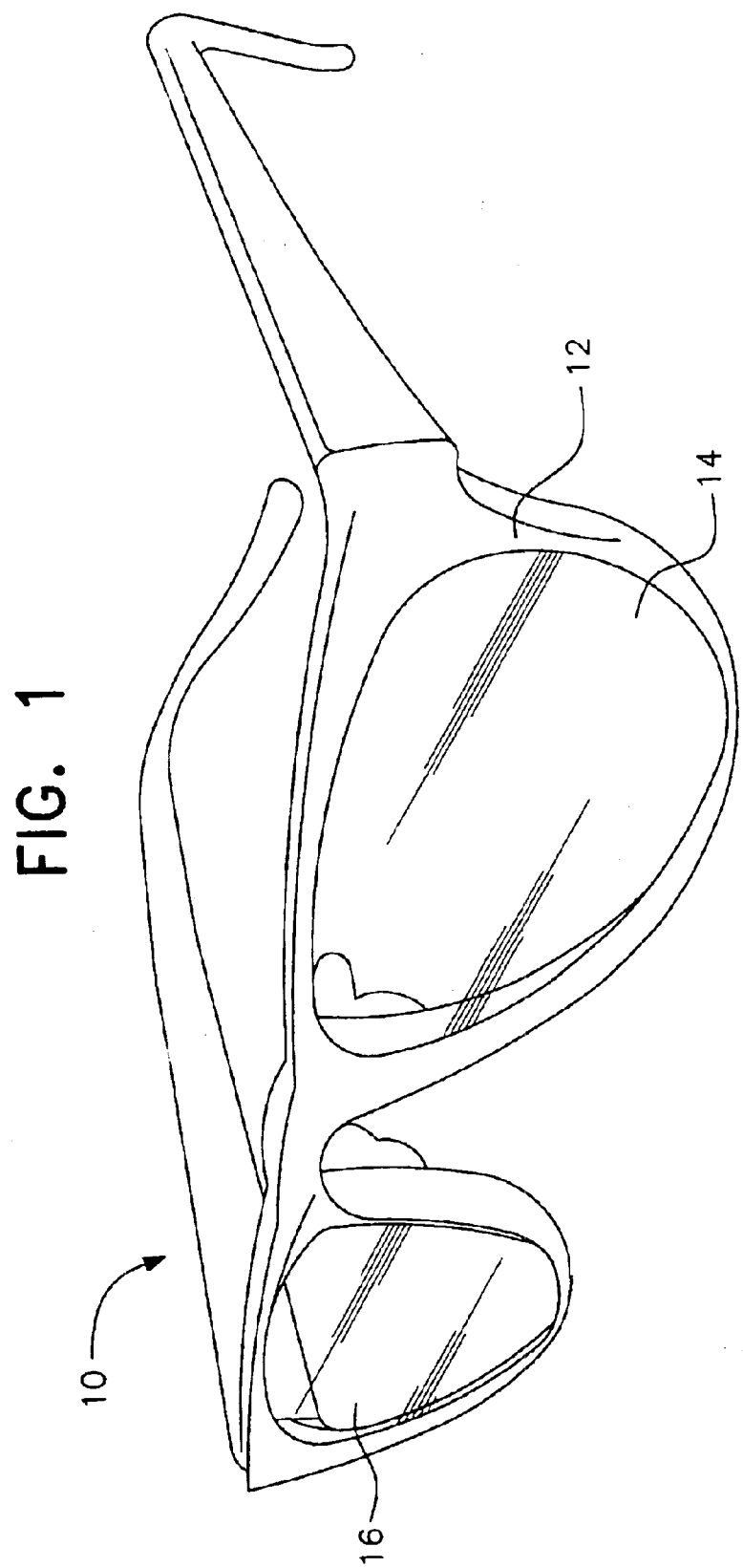
FIG. 1 illustrates a pair of eyeglasses with hetero-chromic filters in the lenses, in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIG. 1, the present invention is preferably embodied in a pair of eyeglasses, generally designated by the reference numeral 10, having eyeglass frames 12 for holding lenses. According to the present invention, one of the lenses 14 is tinted to be pale green, while the other lens 16 has a slightly darker yellow tinting. As used herein, "darker" refers to a greater level of color saturation. Either lens 14, 16 may be green or yellow, with the remaining lens then being the other color, depending upon the vision requirements of the person for whom the glasses are made, with the eye suffering the greatest visual loss typically being equipped with the yellow filter.

According to the preferred embodiment for patients with binocular vision, where the patient's vision is correctable and has been so corrected in the better eye to approximately 20/20, with the poorer eye ranging between about 20/40 to 20/50, visual contrast may be enhanced by placing the pale green filter over the better eye and the slightly darker yellow filter over the poorer eye. This technique creates a conflicting color-retinal-rivalry between the two eyes, and encourages better visual contrast. The quality of the patient's vision is improved for distance vision (driving, movies, TV, etc.), with few patients not experiencing some improvement.

While hetero-chromic filtration does produce color-retinal rivalry, suppression does not occur, because the same object in the visual field is being viewed binocularly, and the zones of high light transmission (of the yellow and green filters) are relatively proximal to each other within the visible light spectrum. Further, while there is also attendant binocular parallax, this is insufficient to 'throw' either foveal image beyond Panum's Area in the fellow eye.

As an underlying precondition to the effective use of the hetero-chromic filters according to the preferred embodiment of the present invention, the patient needs to begin with good single binocular vision. To make this determination, Worth 4-Dot red/green spectacles are combined with hetero-chromic filters, and if the patient still sees four dots and the white-target dot exhibits a red/green mix, then binocularity has not been disrupted.

For monovision contact lens wearers, in cases where patients are using this modality in order to avoid the-need for a reading spectacle prescription, hetero-chromic filters are beneficial, especially for night vision. In this circumstance, however, a reverse technique is implemented in which the yellow filter is placed over the dominant distance-vision eye, thus lessening the conflict with the non-dominant reading eye.

That monovision patients do not diplope for distance vision, is an attestation to the robustness of single binocular vision wherein, cortically, one clear image fuses with one blurred image. While this visual disparity may not disrupt binocularity, there is an induced additional decline in stereopsis when interocular visional acuity differs by more than one line (easily a consequence of the equivalent of a presbyopic add-in excess of 1 diopter). This would suggest better monovision outcomes by augmenting the distance sighting preference. It has also been noted that higher-frequency contrast sensitivity is lowered in the presence of hydrophilic contact lenses. Since monovision is virtually an exclusive contact lens-fitting province, any method that would improve contrast sensitivity is beneficial. In each of the above circumstances, the supplemental usage of hetero-chromic filtration serves to lessen the aniso-image conflict.

The hetero-chromic filters can be incorporated into the patient's existing spectacle prescription. Cosmetically, there is a slight 'harlequin' appearance to the face, i.e., the green filter is virtually unseen, and there is a slight yellowish cast to the other side of the face. This tradeoff is seldom objectionable when the wearer feels better equipped to manage visual tasks.

For contact lens wearers, whether for monovision or distance-vision purposes, the hetero-chromic filters may be put into a supplemental eyeglass frame that is worn over the contact lenses. Alternatively, the hetero-chromic filtration system according to the present invention may be embodied within the contact lenses themselves, whether hard lenses, gas-permeable lenses or hydrophilic soft lenses, by incorporating an appropriate dye into each contact lens that is benign and compatible with the wearer's tear fluid as well as the corneal and conjunctival tissues of the eye.

Figure 2:
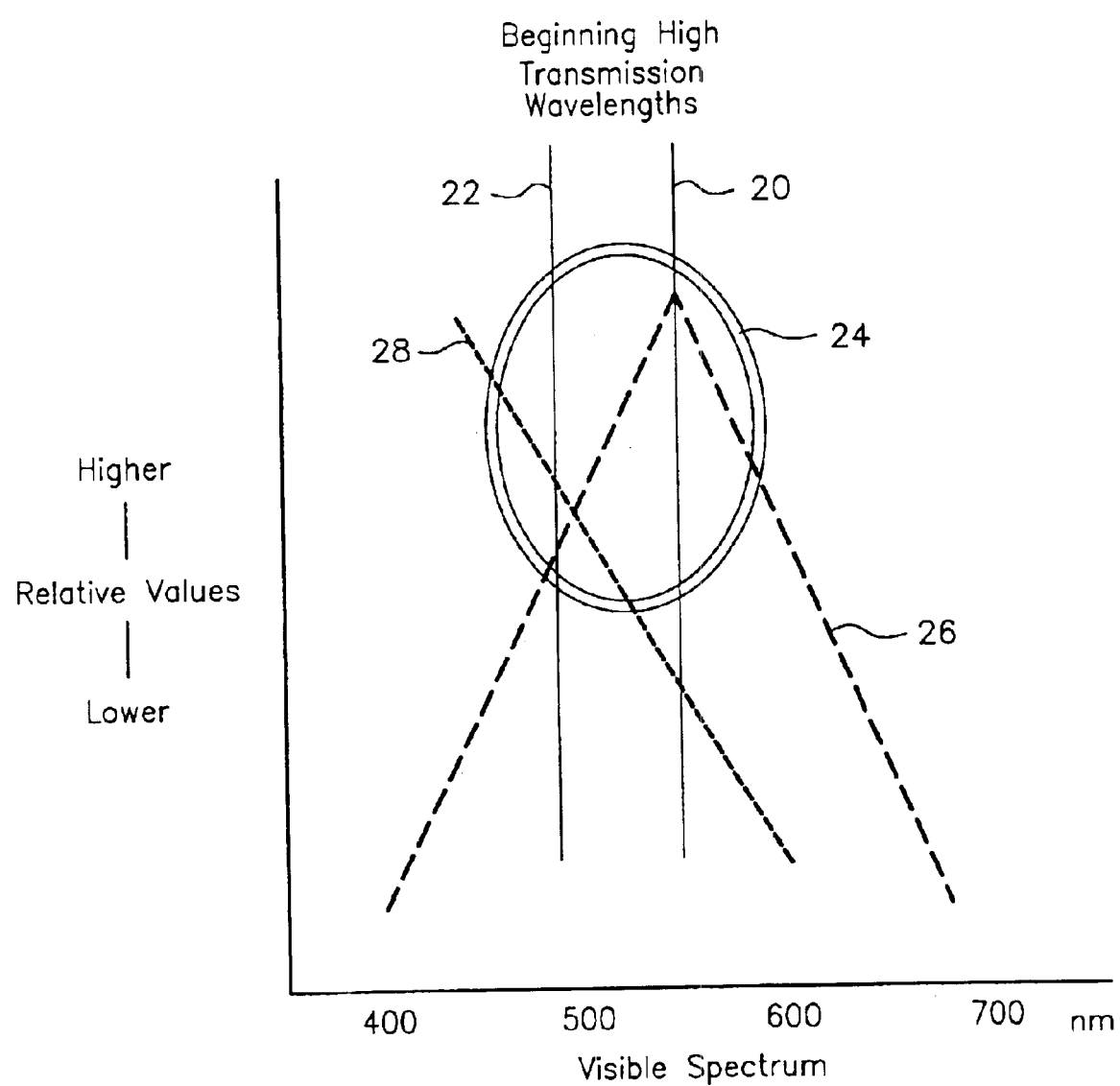
FIG. 2 is a graph depicting the hetero-chromic zone of functionality for filters in the green and yellow wavelengths within the visible spectrum, as utilized by the present invention.

The selection of the filter colors according to the present invention takes into account that the human eye has its greatest sensitivity in the visual spectrum at approximately 555 nm. As representatively shown in FIG. 2, high transmission in the yellow filter 20 may begin at approximately 510 nm, with a preferred peak of about 555 nm. This near-matching of the yellow filter to the most light-sensitive cones heightens the conflict with what is seen by the green-light-filtered, better-acuity eye. The green filter high transmission 22 begins at about 470 nm, with an optimal peak of approximately 500 nm. With both lenses within these high transmission zones defining a hetero-chromic zone of functionality 24, there is no subjective color "mix" or "yellowing". In addition, photon sensitivity 26 is maximized in the yellow filter, while greater differentiation is obtained due to the increased scattering effect 28 that is present in the shorter green wavelengths. Suggested evidence of this is that Short Wavelength Filters (SWAF-'Blue-Blockers') significantly lowered the performance of color-normal observers (Farnsworth Dichotomous Test). In addition, iso-chromic filtration of light does not have the 'provoking' effect of hetero-chromic filtration.

The degree of color saturation or "darkness" within the filters may be varied according to the needs and/or perceptions of the patient. For example, the color-retinal conflict is augmented by doubling the saturation of the yellow filter in comparison with that of the paler green filter. For example, the yellow filter may have a 20% saturation while the green filter has a 10% saturation. However, levels of saturation are limited in practice to that degree of color intensity beyond which the wearer notices the color. Generally, with a 30% yellow filter color saturation, although with some patients a reduction to a 20% saturation level is recommended, the sensation of 'seeing yellow' disappears almost instantly from the wearer's viewpoint, and thereafter has a minimal effect on 'perceived' color. Nor does there ensue competitive/alternating perception of green or yellow appearance to targets being viewed binocularly (dichoptic hue cancellation effects). This is in contrast to an analglyphic spectacle structured with alternate dark green and dark red filters that produce alternating 'washing' of perceived objects as green or red, due to the fact that the nanometer transmission zones are relatively far apart within the visible spectrum, i.e., 400 nm–700 nm. Hetero-chromic filters as used within the present invention do not create this distracting effect, due to the nearer proximity of the competing wavelengths used to filter each eye.

Overall, it appears that contrast sensitivity is not amenable to improvement or deterioration with repetitive testing. This suggests that whatever visual contrast benefit the wearer initially experiences will continue, so long as the ocular conditions remain relatively stable. Should future ocular degradations eventuate, wherein corrected visual acuity drops off below 20/60 to 20/80 in the poorer eye, then hetero-chromic filtration would probably forfeit any original advantage it offered. In monovision cases, where the dominant eye might similarly degrade then, appropriately, that patient would be taken out of a monovision format, and be refitted with distance-vision contact lenses; hetero-chromic filtration might then be reinstituted with the poorer visual acuity eye receiving the yellow filter.

The present invention also takes advantage of the fact that the human eye can detect a flux of 10 photons/second at 555 nm, with this sensitivity dropping off sharply to approximately 125+ photons/second for light received by the retina via shorter wavelengths (450 nm) or longer wavelengths (650 nm). Regardless of whether it is daylight, twilight or darkness, the yellow filter bandwidth encompasses the range of photopic cone-sensitivity (approximately 555 nm) and the Purkinje-shifted scotopic-cone sensitivity (approximately 510 nm). Although photopic monovision performance is more closely comparable to visual performance with balanced distance-vision corrections, scotopic monovision performance correlates more poorly.

In developing the present invention, it was postulated that where there is good binocularity for distance vision, this function is not disrupted by hetero-chromic filtration. It was also postulated that the shorter wavelength green filter may have a subtractive effect, and thus slightly burden the better eye, without diminishing its correctable visual acuity. The burdening effect of the green filter has multiple components. Shorter wavelength scattering is greater than long wavelength scattering, i.e., 500 nm scatters twice as much as 600 nm. Both Rayleigh and Tyndall incoherent scattering may contribute to the subtractive characteristic of the green filter. Also color constancy of green chips (Farnsworth-Munsell Test) decreases along the Planckian Locus by shifting toward a 'perceived blue'. Green-filtered light produces a defocusing effect of 0.2 diopter, the same as for either white or other monochromatic light wavelengths, which has very minor negative effect upon visual acuity and contrast sensitivity.

It was further postulated that the longer wavelength yellow filter on the poorer acuity eye enhances contrast sensitivity because the competitive binocular color-rivalry is below a threshold that would produce a suppression of the image received by either eye and, instead, heightens the conflict between the two eyes and subjectively improves contrast sensitivity, beyond what is achievable with iso-chromic filtration. However, as noted earlier, with monovision patients the effect of hetero-chromic filtration is just the opposite as it supplementally enhances the contrast sensitivity of the dominant distance eye (with the yellow filter) and thus lessens the monovision-imposed conflict between the two eyes. Finally, it was postulated that, because the green and yellow filter wavelengths are relatively close to each other within the visible spectrum, the resultant binocularly-viewed targets do not display temporal alternation of different color-perceptions.

In practice, the decision to provide a particular patient with hetero-chromic filtration is made completely upon the subjective preference of the patient, utilizing a 'forced-choice' inquiry. During initial testing, in-office viewing of street signs, license plate numbers, etc., was utilized. If the patient response was positive, then hetero-chromic filtration was utilized. Where the response was neutral or indeterminate, then this modality was not recommended.

A good indication that hetero-chromic filtration is salutary is evidenced by reversing the filters. The patient will usually experience no enhancement of visual contrast, and/or comment that the visual contrast is less. Out of over 60 patients evaluated as to the efficacy of hetero-chromic filtration, only six individuals were noted who could not subjectively discern any improvement in visual contrast.

During testing, several factors were considered in the precise choice of color filters. Initially, a green filter with high transmission beginning. at approximately 470 nm and a yellow filter with high transmission beginning at approximately 500 nm were used. Such filters may be embodied with appropriate cutoff frequencies, or filters having a narrow pass band may be used. For example, the green filter could be embodied with a narrow band pass filter of approximately 450–520nm with preferred peak of 500 nm, and the yellow filter with a band pass filter of 510–600 nm with an optimal peak of 555 nm. Other comparable filtering constructions may also be used as would be understood by persons of ordinary skill in the art.

Figure 3:
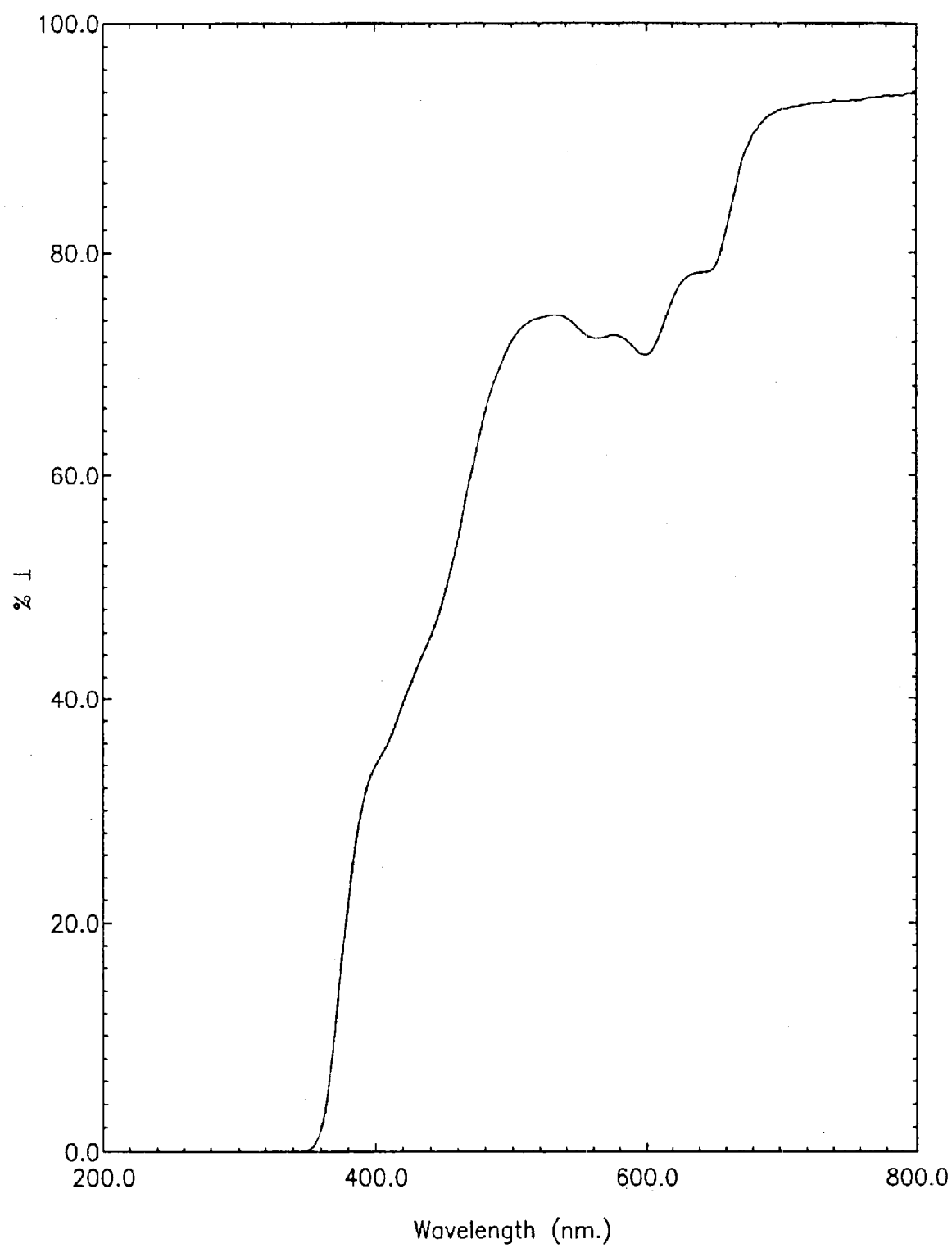
FIG. 3 is a representative spectrophorometry transmission curve for green dye, as utilized in one of the lenses in accordance with the present invention.
Figure 4:
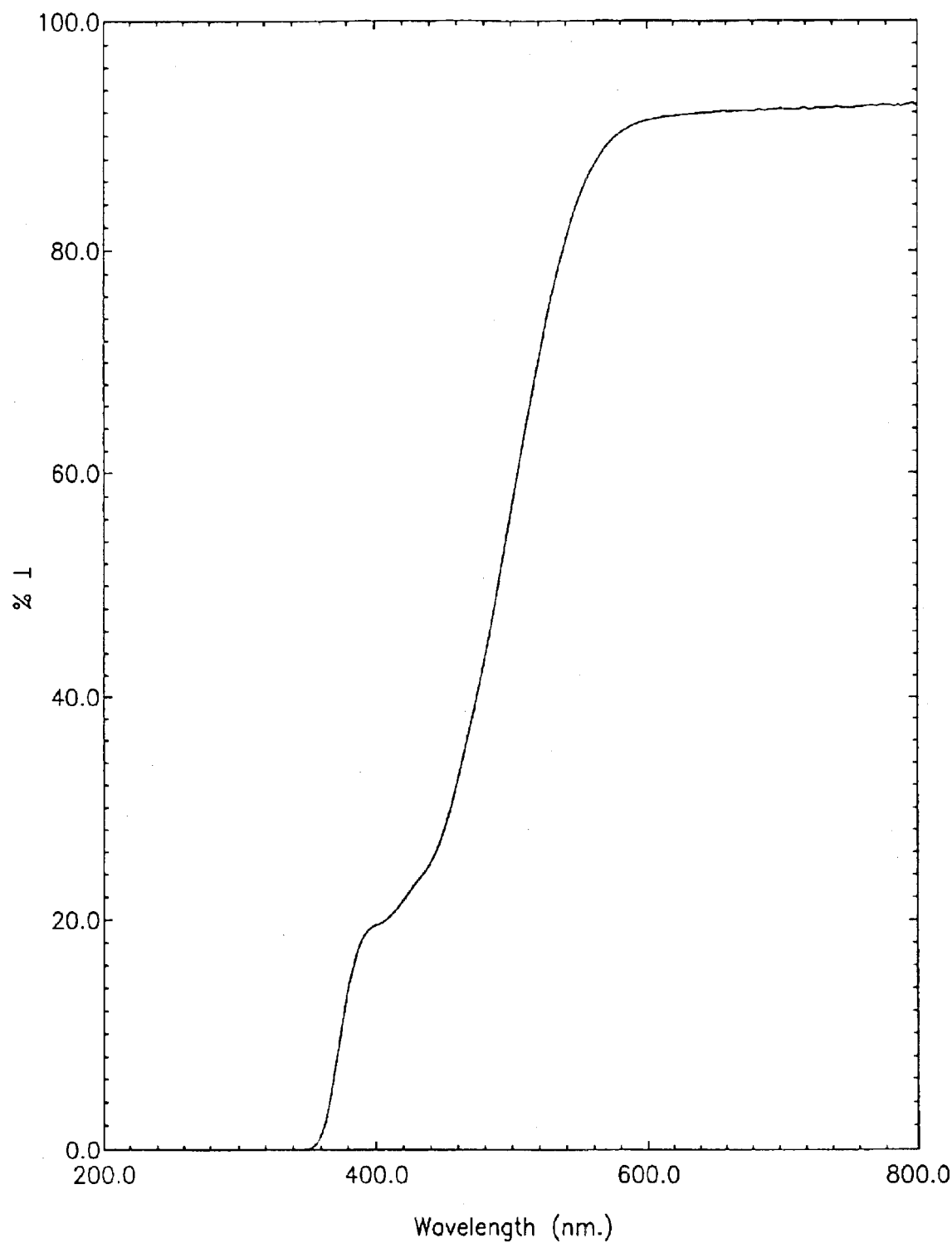
FIG. 4 is a representative spectrophorometry transmission curve for yellow dye, as utilized in one of the lenses in accordance with the present invention.

It was felt that if the peak or high transmission nanometer areas of both the green and yellow filters were relatively close (within the visible spectrum), there would be less potential to disrupt binocularity and the 'harlequin' appearance would be less cosmetically objectionable. Spectrophorometry transmission curves for such green and yellow dyes are depicted in FIGS. 3 and 4, respectively, and show that transmission greater than about 60 percent begins at approximately 470 nm for the green filter and at approximately 500 nm for the yellow filter. Representative coloring agents include Green Dye C200-70 and Yellow Dye C200-61 from Phantom Research Labs. BPI also has dyes with similar characteristics (BPI Green Pill and BPI Winter Sun).

Enumerated herewith is a series of forty hetero-chromic filtration histories, wherein the patient experienced a noticeable improvement in contrast sensitivity, with individual patient data being noted relative to the usage of the yellow filter.

Spectacle Users
(Yellow Filter in Spectacle Prescription on Poorer Visual Acuity Eye)

| Case Age Sex | Occupation | Poorer Eye Prescription | & Vc | Comments |
|---|---|---|---|---|
| 1. IC-61-M | Teacher/DJ | −16.50 | 20/30+ | Keratoconus |
| 2. RN-54-M | MD-Research | +2.50 −7.00 × 45 | 20/60+1 | Keratoconus |
| 3. CA-90-M | Dentist | +6.00 −4.00 × 12 | 20/40− | Sen. Cataract |
| 4. EW-70-F | Volunteer | −3.50 −1.75 × 108 | 20/50+ | Sen. Cataract |
| 5. LM-54-F | Homemaker | −2.25 | 20/20− | |
| 6. PG-83-F | Homemaker | −1.75 | 20/40− | AMD/Dry |
| 7. HK-72-F | Service/Volunteer | −3.00 −1.25 × 25 | 20/30− | Sen. Cataract |
| 8. PL-77-M | Retired/Writer | −4.25 −1.00 × 140 | 20/40− | Sen. Cataract |
| 9. AD-62-M | Engineer | −7.25 −2.00 × 105 | 20/60 | Macular Pucker |
| 10. KM-56-F | Ret/Office admin | −12.00 (+irreg cyl) | 20/30− | Keratoconus |
| 11. TK-68-M | Builder/pilot | −3.75 | 20/20− | |
| 12. LG-54-F | Homemaker | −2.00 −1.00 × 71 | 20/20 | |
| 13. DP-62-M | Teacher | −3.75 | 20/20− | |
| 14. EK-70-F | Homemaker | −3.75 −0.75 × 35 | 20/20−2 | Sen. Cataract |
| 15. SS-62-F | Medical Supply | +1.00 | 20/30− | Sen. Cataract |
| 16. GS-78-F | NIH Admin. | +4.50 −1.50 × 35 | 20/30 | Sen. Cataract |
| 17. BF-80-F | Sailor/Skater | +1.00 | 20/30+ | Keratoconus |

-continued

| Case | Age Sex | Occupation | Poorer Eye Prescription & Vc | | Comments |
|---|---|---|---|---|---|
| 18. | AW-36-F | Accounting | −3.50 −2.75 × 12 | 20/30+ | Keratoconus |
| 19. | MS-28-M | Marketing | −6.00 −1.75 × 50 | 20/60 | Post-LASIK |
| 20. | ML-73-F | Med. Secretary | −3.25 −0.25 × 90 | 20/25 | Sen. Cataract |

Monovision CL
(Yellow Filter in Supplemental Plano/spectacle on Dominant Eye)

| Case | Age Sex | Occupation | Dominant Prescription & Vc | | Comments |
|---|---|---|---|---|---|
| 1 | GN-64-F | Office Admin | +3.00 | 20/20− | |
| 2. | TR-66-F | Homemaker | −2.50 | 20/20 | |
| 3. | JM-69-F | Real Estate | +4.00 −0.75 × 150 | 20/25 | Sen. Cataract |
| 4. | SP-56-F | Teacher | −2.00 | 20/20− | Acl. Apahkia |
| 5. | RA-54-F | Computer Superv. | −3.75 | 20/25− | |
| 6. | JS-52-M | Builder | −6.00 | 20/20 | |
| 7. | LA-72-F | Homemaker | −2.75 | 20/25 | Sen. Cataract |
| 8. | DG-71-F | Office/ Technician | +1.75 −0.25 × 77 | 20/20− | Int. Exotropia |
| 9. | HZ-63-F | Teacher | P1 −2.25 × 120 | 20/25 | |
| 10. | HM-66-F | Business | +4.75 | 20/30+ | |
| 11. | JS-63-F | Homemaker | −4.25 −1.00 × 180 | 20/20− | Sen. Cataract |
| 12. | ES-56-M | Computer/ Tech | −3.00 −1.50 × 83 | 20/20− | |
| 13. | DS-59-F | Teacher | −3.00 −0.50 × 75 | 20/20 | |
| 14. | MR-71-F | Homemaker | −0.75 −0.25 × 90 | 20/25+ | Sen. Cataract |
| 15. | EMc-39-F | Homemaker | −2.00 −5.00 × 103 | 20/30+ | Sen. Cataract |
| 16. | RH-74-M | Ret. IBM Tech | −3.75 | 20/20 | |
| 17. | SW-55-F | Teacher | −2.50 −1.00 × 85 | 20/20 | |
| 18. | MD-50-F | Homemaker | −4.25 −1.00 × 5 | 20/20− | |
| 19. | DM-78-F | Arts/ Volunteer | +1.75 −0.50 × 15 | 20/30 | Sen. Cataract |
| 20. | DS-78-M | Retired | −2.25 −1.00 × 172 | 20/25 | Sen. Cataract |

The present invention may also be advantageously used in post-LASIK surgery scenarios. In recent years, the advent of this popular method of corneal surgery to minimize or eliminate refractive errors has produced many ametropic residual outcomes that are not amenable to secondary enhancement procedures. In these situations, hetero-chromic filtration, with the yellow filter on the eye with greater residual refractive error, may confer improved contrast sensitivity. In a monovision LASIK case, the yellow filter would be placed over the dominant, distance vision eye.

The hetero-chromic filtration study conducted in development of the present invention provided positive feedback from patients with a variety of visual problems, and the improvement-responses varied from 'just discernable', 'incrementally better', to 'significantly improved'. While these responses may be considered anecdotal and idiosyncratic, the present invention nonetheless has been shown to provide value to a significant portion of the population.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. Eyewear for improved visual clarity comprising:
an eyeglass frame having two rims to hold two lenses;
a first lens fitted within a first rim of said frame and having a green tint; and
a second lens fitted within a second rim of said frame and having a yellow tint such that said second lens is visibly different from said first lens and said first and second lenses create a conflicting color-retinal rivalry in a wearer's eyes when said eyewear is worn.

2. The eyewear as set forth in claim 1, wherein said first lens has a transmission greater than about 60 percent beginning about 470 nm and said second lens has a transmission greater than about 60 percent beginning about 500 nm.

3. The eyewear as set forth in claim 1, wherein a green color saturation level of said first lens is less than a yellow color saturation level of said second lens.

4. The eyewear as set forth in claim 1, wherein said first lens has a band pass of between about 450–520 nm and said second lens has a band pass of between about 510–600 nm.

5. Eyewear for improved visual clarity comprising:
an eyeglass frame having rims to hold two lenses;
a first lens fitted within said frame and having a green tint; and
a second lens fitted within said frame and having a yellow tint, said first lens having a 15% green color saturation and said second lens having a 30% yellow color saturation.

6. Eyewear for improved visual clarity comprising:
an eyeglass frame having rims to hold two lenses;
a first lens fitted within said frame and having a green tint; and
a second lens fitted within said frame and having a yellow tint, a peak filter bandwidth of said first lens being approximately 500 nm and a peak filter bandwidth of said second lens being approximately 555 nm.

7. The eyewear as set forth in claim 4, wherein said first lens has a 10% green color saturation and said second lens has a 20% yellow color saturation.

8. Eyewear for improved visual clarity comprising:
an eyeglass frame having rims to hold two lenses;
a first lens fitted within said frame and having a green tint; and
a second lens fitted within said frame and having a yellow tint, said first lens having a green color saturation level approximately half a yellow color saturation level of said second lens.

9. The eyewear as set forth in claim 1, wherein at least one of said first and second lenses also includes a prescription vision correction.

10. Eyewear for improved visual clarity comprising:
a first lens having a pale green tint; and
a second lens having a yellow tint such that said second lens is visibly different from said first lens;
wherein said first and second lenses are worn simultaneously by a person to create a conflicting color-retinal rivalry in a wearer's eyes for improved visual clarity.

11. The eyewear as set forth in claim 10, wherein said first lens has a transmission of greater than 60 percent beginning at about 470 nm, and said second lens has a transmission of greater than about 60 percent beginning at about 500 nm.

12. The eyewear as set forth in claim 10, wherein a green color saturation level of said first lens is less than a yellow color saturation level of said second lens.

13. The eyewear as set forth in claim 12, wherein said green color saturation level is approximately half said yellow color saturation level.

14. The eyewear as set forth in claim 13, wherein said green color saturation level is approximately 15% and said yellow color saturation level is approximately 30%.

15. The eyewear as set forth in claim 10, wherein at least one of said first and second lenses also includes a prescription vision correction.

16. The eyewear as set forth in claim 10, wherein said lenses are fitted in an eyeglass frame.

17. The eyewear as set forth in claim 10, wherein said lenses are contact lenses.

18. A method of improving a patient's visual clarity when the patient has a better eye and a poorer eye in terms of visual acuity, the method comprising the steps of:

placing a pale green filter having a transmission greater than about 60 percent beginning about 470 nm over the better eye; and simultaneously placing a darker yellow filter having a transmission greater than about 60 percent beginning about 500 nm over the poorer eye;

wherein a color saturation level of the green filter is less than a color saturation level of the yellow filter.

19. Eyewear for improved visual clarity comprising:

a first lens having a green tint;

a second lens having a yellow tint; and a color saturation level of said green tinted first lens being less than a color saturation level of said yellow tinted second lens, said first and second lenses being worn simultaneously by a person for improved visual clarity.

20. The eyewear as set forth in claim 19, wherein at least one of said first and second lenses also includes a prescription vision correction.

21. The eyewear as set forth in claim 19, wherein said lenses are fitted in an eyeglass frame.

22. The eyewear as set forth in claim 19, wherein said lenses are contact lenses.

23. Eyewear for improved visual clarity comprising:

a first lens having a green tint and a peak filter bandwidth of approximately 500 nm;

a second lens having a yellow tint and a peak filter bandwidth of approximately 555 nm; and said first and second lenses being worn simultaneously by a person for improved visual clarity.

24. The eyewear as set forth in claim 23, wherein at least one of said first and second lenses also includes a prescription vision correction.

25. The eyewear as set forth in claim 23, wherein said lenses are fitted in an eyeglass frame.

26. The eyewear as set forth in claim 23, wherein said lenses are contact lenses.

27. The method as set forth in claim 18, wherein the green filter has a transmission greater than about 60 percent beginning about 470 nm, and said yellow filter has a transmission greater than about 60 percent beginning about 500 nm.

28. A method of improving a patient's visual clarity when the patient has a better eye and a poorer eye in terms of visual acuity, the method comprising the steps of:

placing a pale green filter having a peak filter bandwidth of approximately 500 nm over the better eye; and simultaneously placing a darker yellow filter having a peak filter bandwidth of approximately 555 nm over the poorer eye.

* * * * *